United States Patent [19]
Goudreau et al.

[11] Patent Number: 4,856,377
[45] Date of Patent: Aug. 15, 1989

[54] PLANETARY GEAR SYSTEM FOR A GAS TURBINE ENGINE

[75] Inventors: Roger Goudreau; Jean-Jacques Jobin, both of Montreal, Canada

[73] Assignee: Pratt & Whitney Canada Inc., Longueuil, Canada

[21] Appl. No.: 1,182

[22] Filed: Jan. 7, 1987

[51] Int. Cl.4 .............................................. F16H 57/10
[52] U.S. Cl. ......................................... 74/768; 74/417
[58] Field of Search ................. 74/768, 769, 756, 757, 74/660, 417

[56] References Cited

U.S. PATENT DOCUMENTS

| | | | |
|---|---|---|---|
| 2,748,623 | 6/1956 | Hill | 74/768 |
| 2,932,443 | 4/1960 | Gunberg | 230/122 |
| 3,397,589 | 8/1968 | Moore | 74/397 |
| 3,496,785 | 2/1970 | Chapman | 74/354 |
| 3,608,684 | 9/1971 | Shimanckas | 192/20 |
| 3,971,267 | 7/1976 | Murakami et al. | 74/769 X |
| 4,020,716 | 5/1977 | Toth et al. | 74/768 |
| 4,142,425 | 3/1979 | Ahlen et al. | 74/768 X |
| 4,192,409 | 3/1980 | Veda | 74/768 X |
| 4,224,838 | 9/1980 | Roushdy et al. | 74/769 X |
| 4,255,987 | 3/1981 | Ciolli | 74/768 |
| 4,291,592 | 9/1981 | Meyerle et al. | 74/768 X |
| 4,309,914 | 1/1982 | Hiersig et al. | 74/768 X |
| 4,334,688 | 6/1982 | Spargo et al. | 277/175 |
| 4,391,163 | 7/1983 | Benthake et al. | 74/768 |
| 4,472,984 | 9/1984 | Cook | 74/768 X |

FOREIGN PATENT DOCUMENTS 318522 2/1902 France .................. 74/417

Primary Examiner—Dwight G. Diehl
Attorney, Agent, or Firm—Foley & Lardner, Schwartz, Jeffery, Schwaab, Mack, Blumenthal & Evans

[57] ABSTRACT

A planetary gear transmission for use in gas turbine engines is provided which includes a gear case housing fixed to the engine housing, and a ring gear is fixed to the interior of the gear case housing in a cavity defined therein. A first stage planetary gear assembly is provided in the housing, including a first sun gear coupled to an output shaft of the engine, and a first planetary gear carrier is rotatably mounted in the housing. First planetary pinion gears are supported by the first carrier gears and mesh with the first sun gear and with the ring gear. A second stage planetary gear assembly is provided within the housing and comprises a second sun gear coupled to the first planetary carrier. The second stage planetary gear assembly includes a second planetary carrier coupled to a propeller shaft. The second carrier supports planetary pinion gears which mesh with the ring gear and the second gun gear. The first or second planetary gear carriers are exchangeable for a similar carrier with a planetary pinion gear arrangement effective to provide reverse rotation of the propeller shaft.

5 Claims, 3 Drawing Sheets

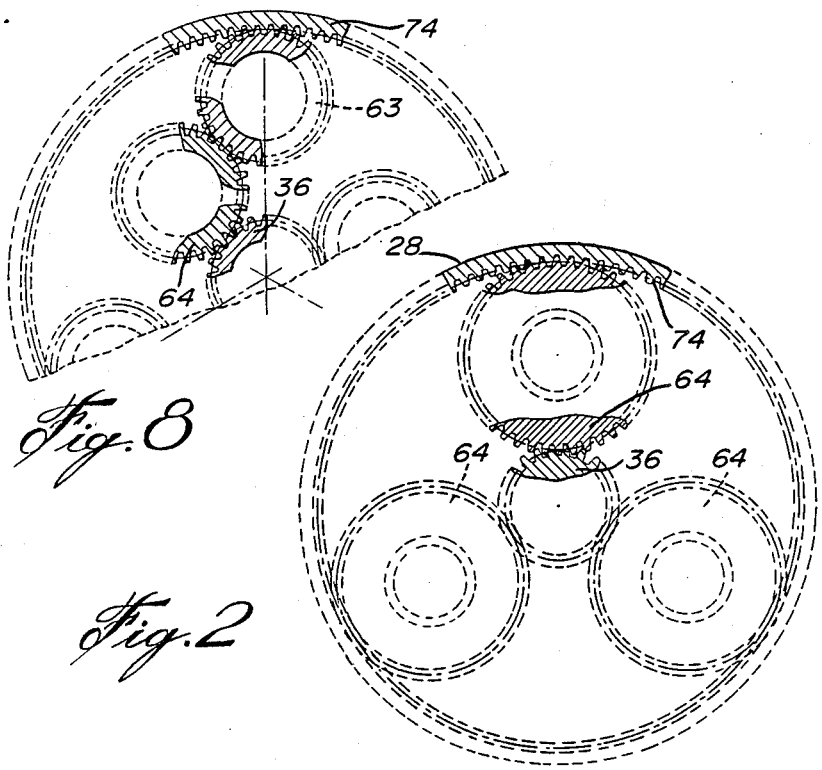
Fig. 8
Fig. 2
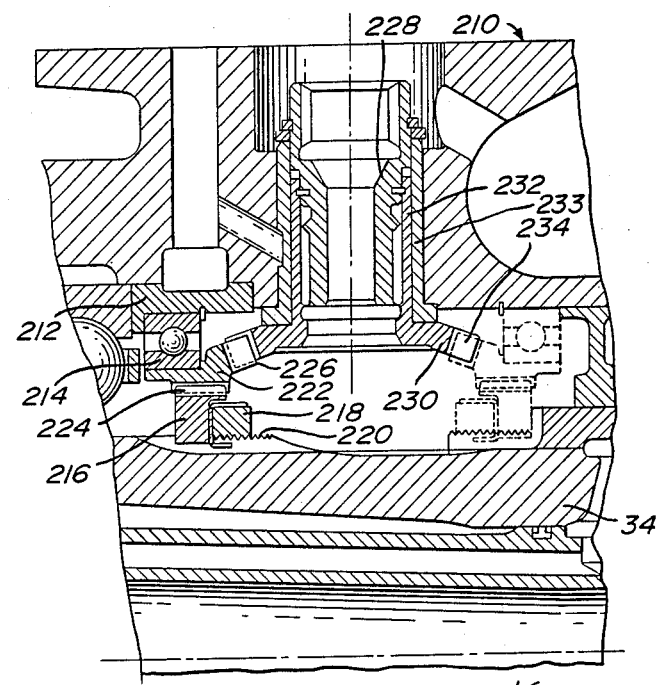
Fig. 5

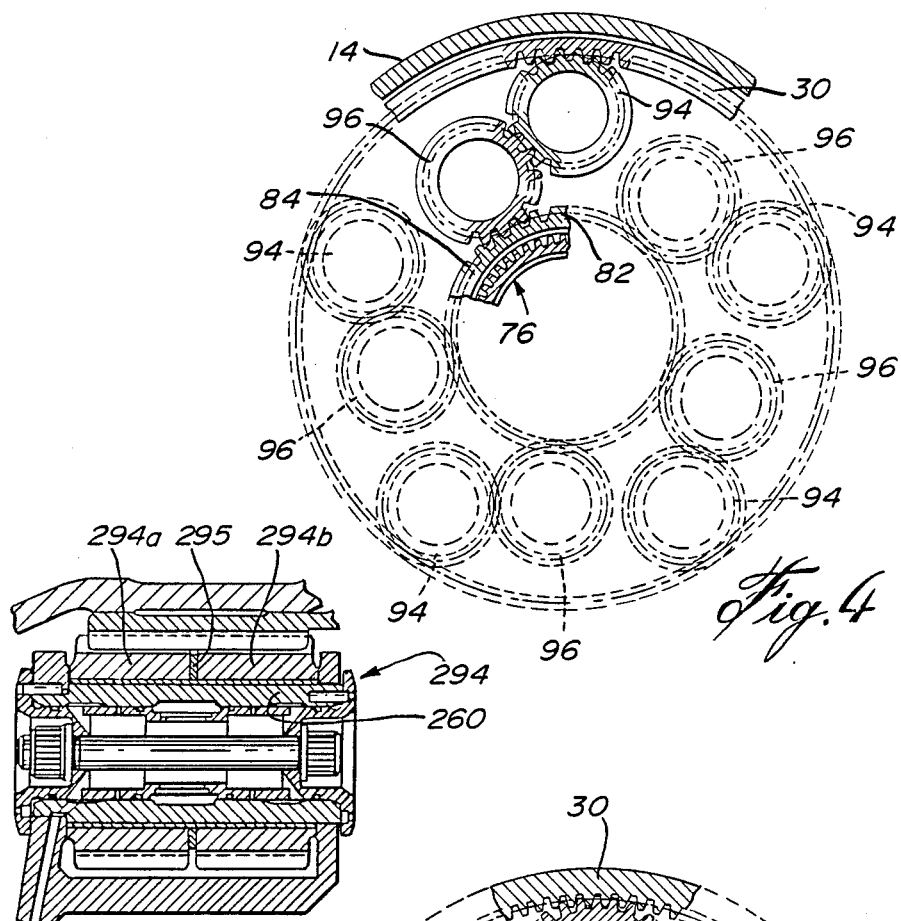
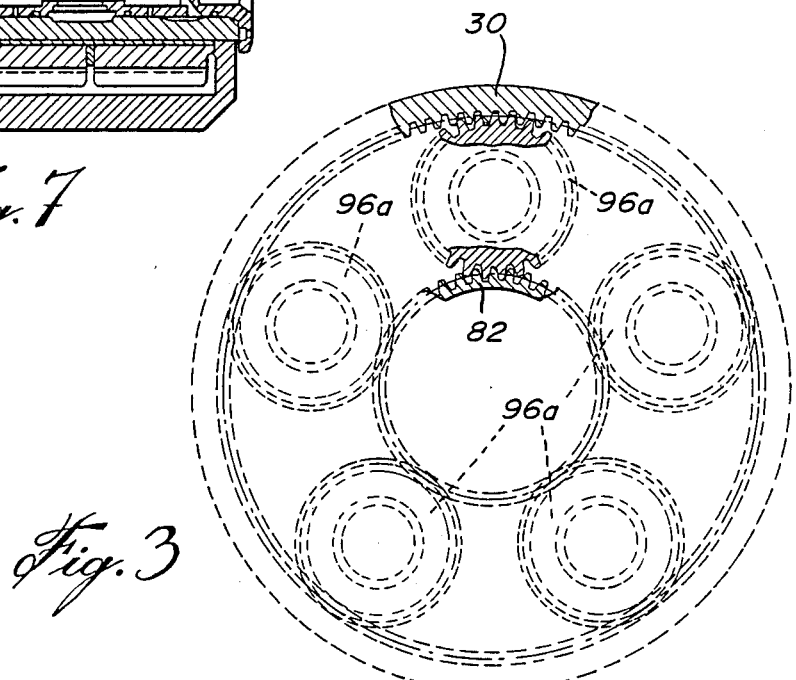

PLANETARY GEAR SYSTEM FOR A GAS TURBINE ENGINE

BACKGROUND OF THE INVENTION

1. Field of the Invention

The present invention relates to a planetary gear system, and more particularly, to a planetary gear system utilized in gas turbine engines.

2. Description of the Prior Art

In the field of propeller-gas turbine powered aircraft and specifically where two or more engines are utilized, it is desirable on some aircraft to have the propellers on either side of the fuselage rotate in opposite directions. Since the turbine engine has a standard rotational direction, it is necessary for those applications to provide different reduction gear transmissions to a given pair of gas turbine engines utilized on the same aircraft. This often means that the turbine engine having a reverse transmission may carry a gear case which is heavier than the standard rotation transmission on the other engine. Furthermore, the gear ratios are usually different and, therefore, the speed of rotation of each engine is different. Since the transmission of each engine in a pair on one aircraft is of different design, the reliability of the transmissions may be different, requiring different parts, etc.

As can be seen, the necessity of having standard rotation and reverse rotation transmissions utilized on identical engines for powering the propellers on a single aircraft, requires substantial inventory since the transmissions are meant to be assembled at the manufacturer's plant rather than in the field.

Furthermore, on each aircraft the various engines must be regulated independently in the light of the difference in weight and sometimes different r.p.m. of the propellers due to the different transmissions.

SUMMARY OF THE INVENTION

It is an aim of the present invention to provide a planetary gear transmission for use in gas turbine engines which can be adapted from standard rotation to reverse rotation by replacing an exchangeable carrier in one of the stages of the transmission.

It is a further aim of the present invention to provide an engine with a planetary gear transmission which can be converted from a standard rotation to reverse rotation with a minimum of inventory and wherein the conversion from standard rotation to reverse rotation can be done in the field.

It is a further aim of the present invention to provide a planetary gear transmission having two-stage reduction, wherein either of the planetary stages can be exchanged for a similar planetary gear stage providing reverse rotation without changing the gear ratio of the transmission or the weight thereof.

In a construction in accordance with the present invention, there is provided a planetary gear transmission for use in gas turbine engines, including a gear case housing fixed to the engine housing and a ring gear fixed to the interior of the housing in a cavity defined thereby. A first stage planetary gear assembly is provided in the housing, including a first sun gear coupled to an output shaft of the engine and a first planetary carrier rotatably mounted in the housing. First planetary pinion gears are supported by the first carrier and mesh with the first sun gear and with the ring gear. A second stage planetary gear assembly is provided within the housing and comprises a second sun gear coupled to the first planetary carrier. The second stage planetary gear assembly includes a second planetary carrier coupled to a propeller shaft. The second carrier supports planetary pinion gears which mesh with the ring gear and the second sun gear. The first or second planetary carrier is exchangeable for a similar carrier with a planetary pinion gear arrangement effective to provide reverse rotation of the propeller shaft.

More specifically, the first and second planetary carriers are arranged for rotating the propeller shaft in the standard or the same direction as the engine shaft, and a similar first or second carrier is provided with supplementary planetary pinion gears meshing with the planetary pinion gears and the ring gear to provide reverse rotation to the respective planetary carrier. In the similar carrier, the planetary pinion gears are smaller and mesh with the sun gear while the supplementary pinion gears mesh with the smaller planetary pinion gears and with the ring gear.

The similar planetary carrier with planetary pinion gears and supplementary pinion gears is of the same radial dimension and mass as the planetary carrier which it replaces, such that the overall mass of the planetary gear transmission adapted for reverse rotation is the same as the mass of the planetary gear transmission arranged for standard rotation. Furthermore, in the similar planetary carrier, the planetary pinion gears and supplementary gears are selected such that the effective gear ratio of the resulting planetary gear transmission for reverse rotation is the same as the planetary gear transmission arrangement for standard rotation.

The advantages of the above arrangement are substantial. Thus, a gas turbine engine for driving a propeller can be converted in the field from standard to reverse rotation and vice versa. All that is necessary is the provision of planetary carriers which correspond to either the first or second stage and which are adapted to provide reverse rotation as described above. The housing can be split at the ring gear such that on removing part of the housing, the first and second planetary stages are exposed, allowing the exchange of the respective planetary carriers. This allows an aircraft operator to maintain a smaller inventory of replacement engines and/or complete transmissions. Furthermore, since a pair of engines provided with the transmissions described herein, even though reverse, will be balanced in terms of mass, and in terms of resulting r.p.m. of the propellers, the fine tuning of a pair of engines on an aircraft will be simplified.

A further improvement which is included herein is the provision of auxiliary drive gear arrangements which must be converted when the planetary gear transmission is reversed. The auxiliary or accessory drives are normally perpendicular to the main propeller shaft and each includes an accessory shaft mounted in suitable bearings and driven by bevel gears, one of which is mounted to the accessory shaft, the other of which is mounted to the propeller shaft. In the case of reversing of the rotation of the propeller shaft, the bevel gear provided on the drive shaft must be reversed 180° in order to ensure that the accessory shaft is rotated in its standard direction.

It has been the practice to mount such bevel gears on the drive shaft in a manner which does not allow for axial expansion or retraction of the drive shaft although deflection thereof is compensated for. In the present invention, the bevel gear is mounted to the propeller shaft by way of a spline connection and is supported to the housing by means of suitable bearings.

BRIEF DESCRIPTION OF THE DRAWINGS

Having thus generally described the nature of the invention, reference will now be made to the accompanying drawings, showing by way of illustration, a preferred embodiment thereof, and in which:

FIG. 2 is a schematic view of the planetary gears of the first stage taken somewhat along line 2—2 of FIG. 1;

FIG. 3 is a schematic view of the planetary gears of the second stage taken somewhat along line 4—4 of FIG. 1, but showing the planetary gears arranged for standard rotation;

FIG. 4 is a schematic view somewhat along line 4—4 of FIG. 1, showing the gears in their arrangement of FIG. 1 for reverse rotation;

FIG. 5 is a fragmentary axial cross-section of a further detail of the present invention;

FIG. 7 is a fragmentary axial cross-section of a detail of another embodiment of the present invention; and FIG. 8 is a fragmentary schematic view of the planetary gears along line 2—2 of FIG. 1, showing the first stage in a reverse rotation.

DESCRIPTION OF THE PREFERRED EMBODIMENTS

Figures 1, 6:
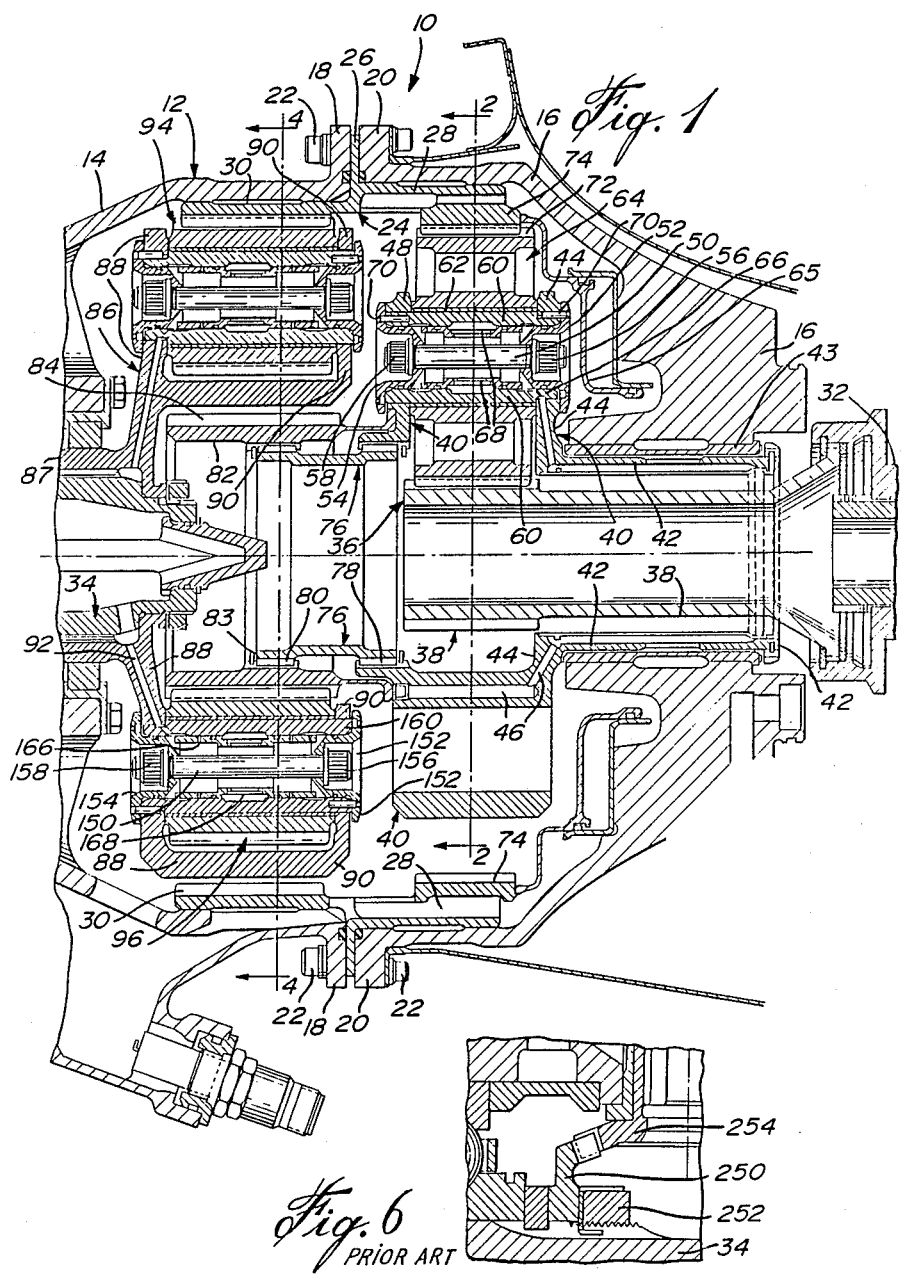
FIG. 1 is an axial view taken through the planetary gear transmission with the second stage converted for reverse rotation.
FIG. 6 is a fragmentary view similar to FIG. 5 showing the prior art.

Referring now to the drawings and especially to FIG. 1, there is shown the gear case for a gas turbine engine adapted to drive a propeller. The planetary gear assembly 10 forming the gear case includes a housing assembly 12 made up of housings 14 and 16 held together along flanges 18 and 20 by means of bolts 22. A ring gear 24 extends about the cavity formed by the housing assembly 12 and includes a flange 26 which is held securely between flanges 18 and 20 of the housings 14 and 16 and by bolts 22. The ring gear 24 has a first stage portion 28 with helical splines and a second stage portion 30 with gear teeth. An output shaft 32 of the gas turbine engine is 1 shown schematically at one end thereof, and a propeller shaft 34 is illustrated at the other end of the housing.

A sun gear 36 is coupled to the output shaft 32. The sun gear includes a cylindrical extension 38 as shown in FIG. 1. An integral first stage carrier 40 is provided in the first stage and includes a cylindrical extension 42 mounted in the housing 16 by means of bearing 43. The first stage carrier 40 includes a pair of hubs 44 and 48. Within the hub 44 is provided an oil passageway 46 for bringing lubricating oil to the gears, as will be described.

In the first stage, as shown in FIG. 2, there are three gears 64 mounted in a carrier 40.

The gear 64 is mounted as follows: A pinion bolt 50 extends between the hubs 44 and 48 and presses as the cylindrical journal 60. A pin 70 fixes the journal 60 to the hubs 44 and 48 and also engages the caps 52 and 54 respectively. It is the bolt head 58 and the nut 56 which press against the end caps 54 and 52 which in turn are axially compressed on journal 60. This journal 60 is slightly longer than the width of hubs 44 and 48. Therefore, the hubs 44 and 48 are never pre-loaded. Each gear 64 is mounted on a journal 60, and a babbit bearing 62 is provided to allow the gear 64 to rotate with a minimum of friction on the journal 60. Lubrication from the passageway 46 enters into the space formed by the cylindrical journal 60 and the caps 52 and 54 and passes through the filters 68 through passageways 66 in the journal 60 into the babbit area.

Each of the three gears 64 has gear teeth 72 which mesh with the sun gear 36 and the ring gear 74. The ring gear 74 is helically splined to the ring gear portion 28 in order to allow the ring gear 74 to have axial movement so that as the load increases or decreases, it reacts in turn on hydraulic diaphragm 65.

A splined coupling 76 is provided centrally of the first stage and extends into the second stage area. The splined coupling 76 includes a splined segment 78 engaging an extension of the hub 48 of the carrier 40.

A sun gear 82 is provided in the second stage with an internal spline 83 engaged by the splined segment 80 of the coupling 76.

The second stage shown in FIG. 1 is provided for reverse rotation. Thus, there are provided gears 94 and 96 with gears 94 engaging the ring gear portion 30, on the one hand, and meshing with the gears 96, on the other hand. The planetary gears 96 engage the sun gear 82.

The carrier 86 in the second stage is shown thus mounting the combination of gears for reverse rotation. The gears are mounted to the carrier 86 in a manner identical to the mounting described with respect to the gears 64 and carrier 40. The carrier 86 includes hubs 88 and 90 with passageway 92.

Gear 96, illustrated in FIG. 1, is identified by numbers identical to the numbers utilized with respect to gear 64 but raised by 100. As shown, both carriers 86 and 40 are cantilever-type carriers, and carrier 86 has an extension 87 splined to the propeller shaft 34.

FIG. 3 illustrates the standard rotation second stage configuration made up of five gears 96a which mesh ring gear 30 and sun gear 82. Thus, in the standard rotation, a sun gear 36 rotates the planetary gears 64 against the stationary ring gear 74, causing the carrier 40 to rotate in the same direction as the sun gear.

Splined coupling 76 transfers this rotation to sun gear 82. If the second stage is made up of gears 96a, as shown in FIG. 3, then similarly the sun gear 82 rotates the gears 96a against ring gear 30, causing the carrier 86 to rotate in the same direction as the sun gear 84 and the output shaft 32. If, however, reverse rotation is required, the second stage carrier 86 is replaced by a carrier 86 having a combination of gears illustrated by gears 94 and 96. The gears 94 and 96 are selected such that they are reasonably equivalent to the weight of gears 96a since ten gears must be provided in the reverse configuration rather than the five gears in the standard rotation configuration of FIG. 3. Furthermore, the gears are chosen such that the gear ratio is the same whether it is the standard rotation configuration of FIG. 3 or the reverse rotation configuration of FIG. 4. The carriers 86 are identical except that machining is different in the region of the gears. Therefore, a physically the same for reverse rotation except for additional machining required due to the added number of gears.

In the case of the reverse rotation configuration as shown in FIGS. 1 and 4, the sun gear 82 rotates gear 96 which in turn rotates gear 94 in the reverse direction against the sun gear 36, and the resultant rotation is reversed such that the carrier 86 rotates in a direction reverse from the sun gear 82 and the output shaft 32. Since the carrier 86 is connected in a splined manner to the propeller shaft 34, the shaft 34 will rotate in the same direction as the carrier 86 which is reverse to the rotation of shaft 32.

The two-stage transmission shown in FIG. 1 considerably reduces the rotation thereof for high torque. For instance, where the output shaft of the gas turbine may be rotating at 30,000 r.p.m., the propeller shaft 34 will, given the configuration shown in the present application, rotate at approximately 1,600 r.p.m.

In operation, it is noted that although the second stage has been described in terms of the standard or reverse rotation, it may well be that the first stage is utilized to provide the reverse rotation. It would, in fact, be even simpler to use the first stage since the first stage in the present case has only three gears and thus the reverse configuration would have fixed gears. FIG. 8 shows the planetary gears arranged for reverse rotation of the first stage. Thus, gears 65 and 67 replace gear 64 in this case.

In any event, when it is required to change the rotation of a particular engine assembly, the bolts 22 are removed to thereby separate the housing 14 from the housing 16. Ring gear 24 can be easily removed from the first stage because of the splined connection between the ring gears 74 and the ring gear segment 28. The carrier 86 or 40, as the case may be, is then replaced by one with reverse or standard configuration.

As shown in FIG. 5, there is an accessory shaft 228 which is driven by the propeller shaft 34. If the reverse rotation configuration is given to the propeller shaft 34, the drive to the accessory shaft 228 must be modified. Thus, the bevel gear 222, which is mounted in a bearing 214 by means of bearing mount 212 on the housing 210, must be removed and rotated 180° to the position shown in dotted lines. The bevel gear 222, which is mounted in the bearing 214 in the case of the present invention, is driven by a splined ring 216 mounted to the shaft 34 by means of locking nut 218 which is threaded on threads 220. The splined ring 216 must also change in the case of reverse rotation. A splined ring 216 is provided with splines 224 which engages the bevel gear 222. The bevel gear 222 has teeth 226 which mesh with teeth 234 on crown gear 230 fixed to the shaft 228 by means of the cylindrical extension 232 and journalled in bearing sleeve 233.

An advantage of the present configuration is that the bevel gear 222 is mounted on the housing and not on the shaft 34 as previously done, as shown in FIG. 6 which represents the prior art. In this case, the bevel gear 250, as shown, is mounted directly to the shaft 34. Any axial expansion or retraction of the shaft causes the bevel gear 250 to bind or loosen against the crown gear 254. In the present invention, the splines 224 allow for axial play relative to the bevel gear 222.

FIG. 7 of the drawings represents another embodiment of gears 94 and 96. Empirically it has been determined that the length-to-diameter ratio of a gear should not exceed 0.860. This ratio takes into consideration deflection, teeth contact, reliability, durability, etc. In order to overcome this compromise and to meet the ratio mentioned above, the gears 96 and 94 can be doubled, as shown in FIG. 7, as, for instance, gears 294a and 294b which can be, but not necessarily, separated by a spacer 295. Since the gear cylinder is mounted on the journal 60 in the case of FIG. 1 and 260 in the case of FIG. 7, the remainder of the gear assembly does not change even though the gear cylinder itself may be doubled.

We claim:

1. A planetary gear transmission for use in gas turbine engines, including a gear case housing fixed to the engine housing, ring gear means including first and second ring gear members fixed to the housing, a first stage planetary gear assembly including a first sun gear coupled to the engine output shaft, a first planetary carrier rotatably mounted in said housing and first planetary pinion supported by the first carrier meshing with the first sun gear and with the first ring gear member, a second stage planetary gear assembly comprising a second sun gear coupled to the first planetary carrier, a second planetary carrier coupled to a propeller shaft, second planetary pinion gears supported on the second carrier meshing with the second ring gear member and the second sun gear characterized in that one of the first and second planetary carriers is exchangeable for a similar carrier with planetary pinion gears and supplementary pinion gear arrangement effective to provide reverse rotation of the propeller shaft, said similar planetary carrier with planetary pinion gears and supplementary pinion gears being of the same radial dimension and mass as the planetary carrier and planetary pinion gears it is replacing such that the overall mass of the planetary gear transmission is the same as the planetary gear transmission arrangement for standard rotation, and the effective gear ration of the resulting planetary gear transmission for reverse rotation is the same as the planetary gear transmission arrangement for standard rotation.

2. A planetary transmission as defined in claim 1, wherein the first and second planetary carriers are arranged for rotating the propeller shaft in the same direction as the engine shaft and the similar carrier is provided with supplementary planetary pinion gears meshing with the planetary pinion gears and the ring gear to provide reverse rotation to the respective planetary carrier.

3. A planetary transmission as defined in claim 1, wherein the similar carrier to the second planetary carrier mounting planetary pinion gears includes double planetary pinion gears supported on the second carrier.

4. A planetary transmission as defined in claim 1, wherein each planetary pinion gear supported on a carrier is characterized by the carrier including a pair of spaced-apart hubs, a journal subtended and supported by the hubs, cap means on either end of the journal, tension means extending between the cap means for compressing the caps against the journal, and locking means locking the cap to the journal and to the carrier hubs respectively, the pinion gear being rotatably journalled on said journal.

5. A planetary gear transmission arrangement as defined in claim 4, wherein the journal has a dimension slightly greater than the hubs such that when tension is applied on the cap, the tension is not transmitted to the hubs of the carrier.

* * * * *